(12) United States Patent
Giordano et al.

(10) Patent No.: US 10,257,301 B1
(45) Date of Patent: Apr. 9, 2019

(54) SYSTEMS AND METHODS PROVIDING A DRIVE INTERFACE FOR CONTENT DELIVERY

(71) Applicant: MiMedia LLC, Wilmington, DE (US)

(72) Inventors: Christopher Giordano, New York, NY (US); Gordon C. Mackenzie, III, Providence, RI (US); Mel Reyes, Katonah, NY (US); Nick Faulkner, New York, NY (US); Jourdan Urbach, Brooklyn, NY (US)

(73) Assignee: MiMedia, Inc., Brooklyn, NY (US)

( * ) Notice: Subject to any disclaimer, the term of this patent is extended or adjusted under 35 U.S.C. 154(b) by 0 days.

(21) Appl. No.: 15/430,242

(22) Filed: Feb. 10, 2017

Related U.S. Application Data

(63) Continuation of application No. 13/834,482, filed on Mar. 15, 2013, now abandoned.

(51) Int. Cl.
  *H04L 29/08* (2006.01)
(52) U.S. Cl.
  CPC .............. *H04L 67/26* (2013.01); *H04L 67/06* (2013.01); *H04L 67/1097* (2013.01); *H04L 67/16* (2013.01)
(58) Field of Classification Search
  CPC .......... H04L 65/00–65/80; H04L 67/00–67/42
  See application file for complete search history.

(56) References Cited

U.S. PATENT DOCUMENTS

| | | | |
|---|---|---|---|
| 5,778,395 A | 7/1998 | Whiting et al. | |
| 5,835,953 A | 11/1998 | Ohran | |
| 5,926,624 A | 7/1999 | Katz et al. | |
| 6,212,512 B1 | 4/2001 | Barney et al. | |
| 6,480,867 B1 | 11/2002 | Kwan | |
| 7,035,943 B2 | 4/2006 | Yamane et al. | |
| 7,346,512 B2 | 3/2008 | Wang et al. | |
| 7,509,684 B2 | 3/2009 | McDonald et al. | |
| 7,660,834 B2 | 2/2010 | Cannon et al. | |

(Continued)

OTHER PUBLICATIONS

Conner, N., "Using ITunes® 10," (Jan. 25, 2011), Que, p. 14 and p. 129.

(Continued)

*Primary Examiner* — Clayton R Williams
(74) *Attorney, Agent, or Firm* — Norton Rose Fulbright US LLP

(57) ABSTRACT

Systems and methods which provide a drive interface for delivery of various content to consumers of the content are described. Embodiments provide access to content shared by a content provider using an interface emulating a disk drive local to the consumer. In operation the user accesses content shared by a content provider using a drive interface content delivery platform of embodiments herein as if the user were accessing content on a local drive. The drive interface of embodiments is branded in correspondence to the content or content provider. Drive interface content delivery platforms of embodiments employ a "push" type content delivery technique whereby content is actively delivered to the consumers under the control or at the initiation of the content provider. Embodiments may additionally provide push delivery of content through web based interfaces and application interfaces.

20 Claims, 9 Drawing Sheets

(56) References Cited

U.S. PATENT DOCUMENTS

| | | |
|---|---|---|
| 7,673,240 B2 | 3/2010 | Morgan |
| 7,685,175 B2 | 3/2010 | Carroll et al. |
| 7,873,040 B2 | 1/2011 | Karlsgodt |
| 7,941,619 B1 | 5/2011 | Rossi |
| 8,090,690 B2 | 1/2012 | Zamkoff et al. |
| 8,095,606 B1 | 1/2012 | Wiley et al. |
| 8,135,800 B1 | 3/2012 | Walsh et al. |
| 8,209,540 B2 | 6/2012 | Brouwer et al. |
| 8,554,735 B1 | 10/2013 | Wible et al. |
| 2002/0083366 A1 | 6/2002 | Ohran |
| 2002/0087588 A1 | 7/2002 | McBride et al. |
| 2002/0133387 A1 | 9/2002 | Wilson et al. |
| 2002/0169854 A1* | 11/2002 | Tarnoff .............. G06F 17/30864 709/219 |
| 2003/0038834 A1 | 2/2003 | Wen et al. |
| 2003/0055671 A1 | 3/2003 | Nassar |
| 2003/0098894 A1 | 5/2003 | Sheldon et al. |
| 2003/0122879 A1 | 7/2003 | Inui et al. |
| 2004/0133629 A1* | 7/2004 | Reynolds .......... G06F 17/30902 709/202 |
| 2004/0158546 A1 | 8/2004 | Sobel et al. |
| 2004/0177319 A1 | 9/2004 | Horn |
| 2004/0193672 A1 | 9/2004 | Samji et al. |
| 2004/0236859 A1 | 11/2004 | Leistad et al. |
| 2005/0071392 A1 | 3/2005 | Sandorfi et al. |
| 2005/0102635 A1 | 5/2005 | Jiang et al. |
| 2005/0108253 A1 | 5/2005 | Metsatahti et al. |
| 2005/0114595 A1 | 5/2005 | Karr et al. |
| 2005/0131902 A1 | 6/2005 | Saika |
| 2005/0131990 A1 | 6/2005 | Jewell |
| 2005/0138066 A1 | 6/2005 | Finke-Anlauff et al. |
| 2005/0216588 A1 | 9/2005 | Keohane et al. |
| 2005/0223277 A1 | 10/2005 | Ballard |
| 2006/0015637 A1 | 1/2006 | Chung |
| 2006/0036611 A1 | 2/2006 | Rothschild |
| 2006/0122839 A1 | 6/2006 | Wang et al. |
| 2006/0155790 A1 | 7/2006 | Jung et al. |
| 2006/0161635 A1 | 7/2006 | Lamkin et al. |
| 2006/0179079 A1 | 8/2006 | Kolehmainen |
| 2006/0195512 A1 | 8/2006 | Rogers et al. |
| 2006/0206547 A1 | 9/2006 | Kulkami et al. |
| 2006/0218435 A1 | 9/2006 | van Ingen et al. |
| 2006/0220986 A1 | 10/2006 | Takabe et al. |
| 2006/0224602 A1 | 10/2006 | Rawat et al. |
| 2006/0230440 A1 | 10/2006 | Wu et al. |
| 2006/0242325 A1 | 10/2006 | Ramaswamy et al. |
| 2006/0277123 A1 | 12/2006 | Kennedy et al. |
| 2006/0288168 A1 | 12/2006 | Stevenson |
| 2006/0291720 A1 | 12/2006 | Malvar et al. |
| 2007/0048714 A1 | 3/2007 | Plastina et al. |
| 2007/0055993 A1 | 3/2007 | Braun et al. |
| 2007/0088678 A1 | 4/2007 | Farago et al. |
| 2007/0106714 A1 | 5/2007 | Rothbarth |
| 2007/0122111 A1 | 5/2007 | Yamamoto et al. |
| 2007/0130400 A1 | 6/2007 | Reisman |
| 2007/0136541 A1 | 6/2007 | Herz et al. |
| 2007/0288536 A1 | 12/2007 | Sen et al. |
| 2007/0296581 A1 | 12/2007 | Schnee et al. |
| 2008/0022058 A1 | 1/2008 | Nadathur et al. |
| 2008/0040139 A1 | 2/2008 | Pousti et al. |
| 2008/0060069 A1 | 3/2008 | Vindici |
| 2008/0082678 A1 | 4/2008 | Lorch et al. |
| 2008/0109414 A1 | 5/2008 | Chun et al. |
| 2008/0115071 A1 | 5/2008 | Fair |
| 2008/0126303 A1 | 5/2008 | Park et al. |
| 2008/0133622 A1 | 6/2008 | Brown et al. |
| 2008/0222734 A1 | 9/2008 | Redich et al. |
| 2008/0250190 A1 | 10/2008 | Johnson |
| 2008/0270395 A1 | 10/2008 | Gossweiler, III et al. |
| 2008/0294453 A1 | 11/2008 | Baird-Smith et al. |
| 2008/0301201 A1 | 12/2008 | Sugimoto et al. |
| 2008/0306872 A1 | 12/2008 | Felsher |
| 2008/0307314 A1 | 12/2008 | Cisler et al. |
| 2008/0307364 A1 | 12/2008 | Chaudhri et al. |
| 2008/0319856 A1 | 12/2008 | Zito et al. |
| 2009/0006643 A1 | 1/2009 | Lee |
| 2009/0019486 A1 | 1/2009 | Kalaboukis |
| 2009/0022129 A1 | 1/2009 | Karaoguz et al. |
| 2009/0024675 A1 | 1/2009 | Hewitt et al. |
| 2009/0083385 A1* | 3/2009 | Heredia .................. G06F 15/16 709/206 |
| 2009/0112878 A1 | 4/2009 | Denny et al. |
| 2009/0132921 A1 | 5/2009 | Hwangbo et al. |
| 2009/0178003 A1 | 7/2009 | Fiedler |
| 2009/0240735 A1 | 9/2009 | Grandhi et al. |
| 2009/0252033 A1 | 10/2009 | Ramakrishnan et al. |
| 2009/0271457 A1 | 10/2009 | Heller |
| 2009/0282336 A1 | 11/2009 | Lindley et al. |
| 2009/0327904 A1 | 12/2009 | Guzak et al. |
| 2010/0070475 A1 | 3/2010 | Chen |
| 2010/0094728 A1 | 4/2010 | Denning et al. |
| 2010/0131385 A1* | 5/2010 | Harrang ................ G06Q 30/00 705/26.1 |
| 2010/0180213 A1 | 7/2010 | Karageorgos et al. |
| 2010/0241731 A1 | 9/2010 | Du et al. |
| 2010/0325549 A1 | 12/2010 | Gibson et al. |
| 2011/0004683 A1 | 1/2011 | Kottomtharayil et al. |
| 2011/0060994 A1 | 3/2011 | Maxwell et al. |
| 2011/0060998 A1 | 3/2011 | Schwartz et al. |
| 2011/0066668 A1* | 3/2011 | Guarraci ........... G06F 17/30233 707/831 |
| 2011/0106910 A1 | 5/2011 | Grasset |
| 2011/0119583 A1 | 5/2011 | Gilley et al. |
| 2011/0243534 A1 | 10/2011 | Thomas et al. |
| 2011/0309946 A1 | 12/2011 | Jonsson et al. |
| 2012/0054679 A1 | 3/2012 | Ma et al. |
| 2012/0072956 A1 | 3/2012 | Thomas et al. |
| 2012/0210220 A1 | 8/2012 | Pendergast et al. |
| 2012/0210351 A1 | 8/2012 | Nukala et al. |
| 2012/0265604 A1 | 10/2012 | Corner et al. |
| 2012/0330963 A1 | 12/2012 | Bartholomew |
| 2013/0024582 A1 | 1/2013 | Rodrigues |
| 2013/0061131 A1 | 3/2013 | Zito et al. |
| 2013/0066856 A1 | 3/2013 | Ong et al. |
| 2013/0173531 A1 | 7/2013 | Rinearson et al. |
| 2013/0304866 A1* | 11/2013 | Wu ..................... H04L 67/1097 709/219 |
| 2014/0188890 A1 | 7/2014 | Clifton et al. |
| 2014/0189734 A1* | 7/2014 | Anguiano .......... H04N 21/4668 725/35 |
| 2014/0198340 A1* | 7/2014 | Bailey .................. G06F 3/1212 358/1.15 |

OTHER PUBLICATIONS

Linder, "Humyo offers 30GB of free online storage," Jun. 25, 2008, [retrieved on Jul. 23, 2013], retrieved from the Internet: URL: http://downloadsquad.switched.com/2008/06/25/humyor-offers-30gb-of-free-online-storage/1 page.

W3Schools.com, "AJAX Introduction," Apr. 19, 2010, [retrieved on Jul. 24, 2013], retrieved from the Internet: URL: http://web.archive.org/web/20100419011010/http://www.w3schools.com/ajax/ajax_intro.asp/, p. 1-2.

International Search Report and Written Opinion issued for PCT/US2010/036105, dated Jul. 13, 2010, 11 pages.

Pash, "Huymo Provides 30GB of Free Online Storage," Jun. 25, 2008, [retrieved from the Internet on Oct. 22, 2014], <URL http://lifehacker.com/397108/humyo-provides-30gb-of-free-online-storage/>, p. 1-9.

Newman, "Amazon Cloud Drive and Cloud Player: A Hands-On Tour," Mar. 29, 2011, <URL http://www.pcworld.com/article/223604/Amazon_Cloud_Drive_and_Cloud_Player_A_Hands_On_Tour.html/>, p. 1-3.

Apple, Inc., "ITunes 8," (C)2009, ver. 8.2.1.6, p. 1-17.

Wikipedia, "Kodak Gallery," https://en.wikipedia.org/wiki/Kodak_Gallery; printed on Jun. 12, 2016; printout pp. 1-3.

Unpublished U.S. Appl. No. 13/103,744 to Wible, et al., filed May 9, 2011, and entitled "Centralized Music Media Gallery."

Unpublished U.S. Appl. No. 13/103,720 to Wible et al., filed May 9, 2011, and entitled "Centralized Media Access Portal."

(56) References Cited

OTHER PUBLICATIONS

Unpublished U.S. Appl. No. 13/834,482 to Giordano et al., filed Mar. 15, 2013, and entitled "Systems and Methods Providing a Drive Interface for Content Delivery."

* cited by examiner

SYSTEMS AND METHODS PROVIDING A DRIVE INTERFACE FOR CONTENT DELIVERY

CROSS-REFERENCE TO RELATED APPLICATIONS

The present application is a continuation of U.S. patent application Ser. No. 13/834,482, filed Mar. 15, 2013 and entitled, "SYSTEMS AND METHODS PROVIDING A DRIVE INTERFACE FOR CONTENT DELIVERY," and is related to commonly assigned U.S. patent application Ser. No. 13/103,693, filed May 9, 2011 and entitled "SYSTEMS AND METHODS FOR DATA UPLOAD AND DOWNLOAD," issued Oct. 8, 2013 as U.S. Pat. No. 8,554,735, and U.S. patent application Ser. No. 13/103,720, filed May 9, 2011 and entitled "CENTRALIZED MEDIA ACCESS PORTAL," the disclosures of which are incorporated herein by reference in their entirety.

TECHNICAL FIELD

The invention relates generally to content delivery and, more particularly, to a drive interface for providing content delivery to consumers of the content.

BACKGROUND

With the proliferation of consumer electronics, such as digital video recorders, digital cameras, digital recorders, and smart devices having image and/or sound recording features readily available to capture various content and personal digital media players and smart devices having image and/or sound reproduction features almost omnipresent to provide playback of the various content, a number of content delivery platforms have become available. For example, content (e.g., a video, photograph, and/or sound file) may be shared by posting the content to social platforms such as YOUTUBE and FACEBOOK. Likewise, such content may be shared through hosting platforms such as PHOTOBUCKET and FLICKR or ecommerce platforms such as ITUNES STORE and XBOX MUSIC. The foregoing content delivery platforms, however, are not well suited for use in many situations.

For example, each of the foregoing delivery platforms employs a "pull" type content delivery technique. That is, a consumer of the media must in some way initiate the content delivery, such as by specifically requesting the particular content or otherwise causing a delivery request to be made. Accordingly, the content is not actively delivered to the consumers under the control or at the initiation of the content provider, but instead the consumer of the content must either be separately notified of the availability of the content for sharing or must discover the availability of the content on their own. It should thus be appreciated that the pull type content delivery technique often does not provide the robust and timely content delivery experience desired by consumers of the content.

Moreover, the content provider has only very limited content control, if any, when using the foregoing delivery platforms. Accordingly, a consumer may be able to access the content an unlimited number of times, copy and distribute the content, etc. once that consumer is provided access to the content delivery platform. The content provider, particularly where the content provider is sharing the content in association with a commercial endeavor (e.g., a celebrity, model, author, etc. sharing content from their professional career), may wish to broadly share the subject content but nevertheless maintain tight control with respect to its use.

Content delivery platforms, such as the exemplary content delivery platforms above, are themselves commercial ventures expressly for facilitating the sharing of content. Accordingly, revenue opportunities for the content provider are dictated by the content delivery platform providers, and are usually very limited in the revenue models available and the amount of revenue provided to the content provider. For example, the revenue opportunities may be limited to some fee sharing arrangement (e.g., fees tied to the number of content files purchased by consumers, the number of accesses by the consumers, etc.), whereby the content delivery platform provider retains a significant portion of the revenue. Moreover, the content delivery platform provider typically controls any advertising or other promotional content provided in association with the content made available via the content delivery platform. Accordingly, in addition to being at the content delivery platform provider's mercy for passing through advertising revenue, the content provider has no control of the particular advertising content that may be presented in association with their content being shared.

In addition to the foregoing disadvantages, the content provider is insulated from the consumers of their content by the content delivery platform. Thus, the content provider is unable to collect rich information about the consumers and their consumption of the content and is limited in their interaction, or means by which they may interact, with the consumers. Accordingly, neither the content provider nor the consumer of the content is provided as rich of an experience as may be desired.

SUMMARY

The present invention is directed to systems and methods which provide a drive interface for delivery of various content (e.g., videos, photographs, sound files, electronic documents, etc.) to consumers of the content. Embodiments of the invention provide access to content shared by a content provider using an interface emulating a disk drive local to the consumer. For example, drive interface code (e.g., an application, applet, smart device app, etc.) may be provided for execution by processor-based systems (e.g., personal computers (PCs), smart phones, personal digital assistants (PDAs), tablet devices, console devices, gaming devices, televisions, set top boxes, automobiles with media infrastructure, media display devices, etc.) used by content consumers (referred to herein as user devices) to operate to provide a drive interface for delivery of content to the consumers. In operation, such a drive interface presents itself to a user as if it were a local drive, and thus the user accesses content shared by a content provider using a drive interface content delivery platform of embodiments herein as if the user were accessing content on a local drive.

It should be appreciated that content providers and consumers utilizing a drive interface content delivery platform of embodiments of the invention may take many forms. For example, a content provider may be a professional (e.g., a celebrity, model, author, etc. sharing content from their professional career), individual (e.g., amateur working towards a professional career), or a business (e.g., a media distributor, a publisher, etc. sharing content as part of their commercial operations) sharing the content in association with a commercial endeavor. Likewise, a content provider may be an individual or a business sharing the content for non-commercial purposes (e.g., an individual sharing content with friends and family or a business sharing content internally, not as part of their commercial operations). A consumer of the content may be any entity, such as an individual, a professional, or a business, having a need or desire for the particular content, whether that need is related to a commercial endeavor or not. Accordingly, it should be appreciated that drive interface content delivery platforms of embodiments of the invention may be utilized in providing consumer to consumer (C-to-C), business to consumer (B-to-C), business to business (B-to-B) content delivery, and consumer to business (C-to-B).

The drive interface of embodiments of the invention is branded in correspondence to the content or content provider, and thus reflects the content or content provider and provides an interactive, direct link between the consumers of the content and the provider of the content. Accordingly, although providing an interface which is similar to that of a local drive, and thus familiar to the user, the branded content delivery drive provides immediately recognizable association with the content provider and/or content. Such branding may be particularly applicable to delivery of content from professionals, such as celebrities, models, and other public figures, to their fan base or constituency.

It should be appreciated that the interaction facilitated through operation of a drive interface of embodiments herein not only provides for delivery of content to consumers, but also allows for the providing of content by the consumer to the content provider. For example, a particular consumer may have content, such as photographs, videos, sound files, etc., relevant to a particular collection of content provided by a content provider (e.g., where the consumer attended a concert relevant to the content of a particular drive interface). Such a consumer may, for example, use a drive interface of embodiments herein to submit that content to the content provider. In operation according to embodiments of the invention, such content submitted by a consumer may be made part of the content of one or more drive interface (e.g., delivered to other consumers subscribed to a same or similar drive interface). Alternatively, such content submitted by a consumer may be integrated as part of the drive interface for that consumer (and perhaps other consumers or consumer groups designated by the submitting consumer) only.

Drive interface content delivery platforms of embodiments employ a "push" type content delivery technique. That is, content is actively delivered to the consumers under the control or at the initiation of the content provider. For example, a content provider may add content to a drive interface utilized in managing corresponding content delivery drives to thereby control delivery of the content to the content delivery drives. The consumer may thus have the content readily, and automatically available (i.e., without the consumer having to actively seek or retrieve the content) on the content delivery drive as any other content stored on a local drive of the consumer's processor-based system. Accordingly, a consumer of the media need not initiate the content delivery, such as by specifically requesting the particular content or otherwise causing a delivery request to be made. The consumer may simply have the pushed content available to them through the content delivery drive provided by the drive interface content delivery platform. The consumer may be alerted to or notified of the arrival of pushed content, such as through a graphical alteration of or addition to an icon representing the content delivery drive, an alert sound, a separate communication (e.g., email, SMS message, pop-up messages, etc.), and/or the like.

Drive interface content delivery platforms of embodiments of the invention may provide push delivery of content to various processor-based devices through means in addition to the aforementioned content delivery drive interfaces. For example, although a local drive type interface provides a readily accepted expedient for accessing certain types or arrangements of content (e.g., albums of videos, photographs, sound files, or documents) and/or using certain processor-based systems (e.g., processor-based systems having graphical operating systems, processor-based systems having suitable user input/output, etc.), the use of such local drive type interfaces may not provide optimum accessibility of content for all situations. For example, a smart phone or PDA may have limited resources (e.g., small display, limited operating system, limited user input, etc.) and/or the type or arrangement of the content (e.g., very large collections of unrelated content) may impede the use of a content delivery drive of embodiments. Accordingly, embodiments of a drive interface content delivery platform also provide other content delivery interfaces, such as web based interfaces and application interfaces, for accessing pushed content by other than the aforementioned content delivery drive interfaces. Consumers of the content are thus provided robust access to pushed content using any of a number of processor-based devices.

It should be appreciated that not only is the consumer's experience expanded and enhanced by operation of drive interface content delivery platforms of embodiments of the invention, but the content provider's experience is also significantly improved over that afforded by prior content delivery platforms. For example, by providing a content delivery platform which is controlled by the content provider and which provides direct access to the consumers of the content, the content provider is able to not only control things such as advertising content which may be delivered with or in association with the content, but also has access to rich information regarding the consumers and their consumption of the content. Likewise, the content provider may be provided robust interaction with the consumers through the drive interface content delivery platform and/or is provided with sophisticated metrics and analytics reporting available through operation of the drive interface content delivery platform. Moreover, the content provider is provided better revenue opportunities, such as ecommerce revenue, direct advertising revenue, revenue sharing for consumers' ancillary purchase of goods and services, etc. Code implemented for providing management functionality (e.g., management dashboard, content delivery drive management interface, etc.) affords the content provider robust control over the content being shared. For example, although the content provider may wish to broadly share the subject content, the content provider may nevertheless maintain tight control with respect to the access, use, further sharing, etc. of the content using the controls implemented by the drive interface content delivery platforms of embodiments. Such controls preferably includes robust rights management, such as may be provided through the aforementioned management dashboard.

Drive interface content delivery platforms of embodiments implement a network based or "cloud based" infrastructure. For example, a drive interface content delivery platform may comprise a network-based mass storage system upon which content is stored for delivery to consumers. In operation according to embodiments, the content may be pushed to the content delivery drive interface (or other content delivery interfaces) of processor-based systems of the appropriate consumers by the network-based mass storage system for local storage by those processor-based systems. Additionally or alternatively, information (e.g., file pointers, "shortcuts", etc.) enabling access to the content may be pushed to the content delivery drive interface (or other content delivery interfaces) of processor-based systems of the appropriate consumers by the network-based mass storage system for use in accessing content stored by the network-based mass storage system. Embodiments may utilize a combination of the aforementioned local content storage and information enabling access to the content, such as with respect to different processor-based systems (e.g., local storage where the processor-based system has adequate resources and access information where the processor-based system has limited resources, local storage for content with less restrictive rights management and access information for content with highly restrictive rights management, etc.). Nevertheless, irrespective of whether local storage of the content is actually employed, embodiments of a drive interface content delivery platform provides a user interface in which the content appears to be stored locally as perceived by the consumer.

Network-based mass storage infrastructure utilized by drive interface content delivery platforms of embodiments of the invention may provide functionality (e.g., primary functionality) other than the foregoing content delivery. For example, network-based mass storage infrastructure providing backup or archival storage of user content (e.g., user media files and/or data), such as the MIMEDIA media storage and access platform provided by MiMedia, Inc. of Brooklyn, N.Y., may be leveraged in providing a drive interface content delivery platform of embodiments herein. In such an embodiment, not only may the network-based mass storage infrastructure be utilized for providing pushed content delivery, but the pushed content may be presented with user content (e.g., as another album) and/or using an interface and protocols which are familiar to the user.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
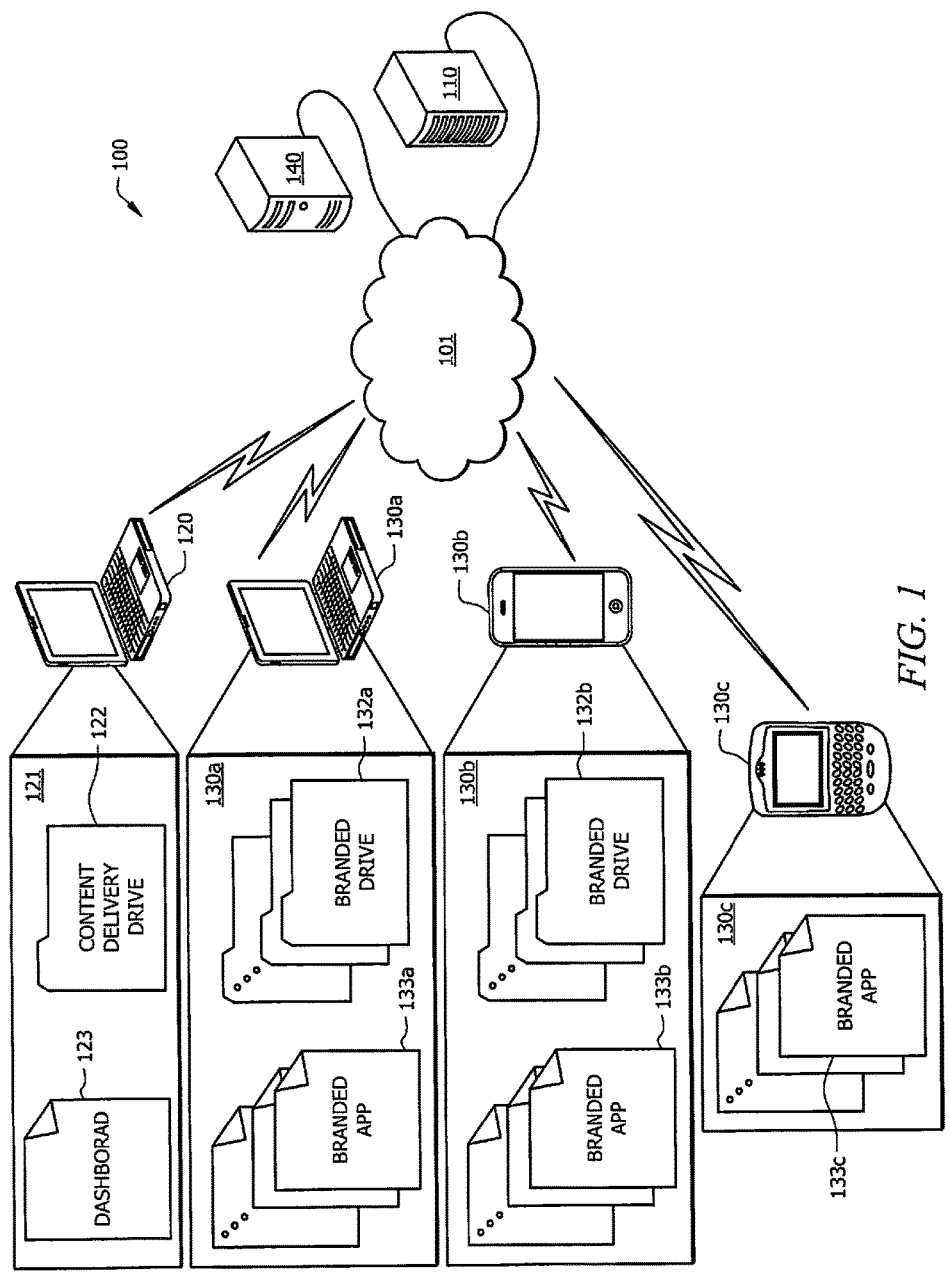
FIG. 1 shows a drive interface content delivery platform of embodiments of the present invention.

FIG. 1 shows an embodiment of drive interface content delivery platform as system 100. System 100 of the illustrated embodiment includes network-based mass storage system 110 coupled to various processor-based systems via network 101. In particular, user devices 120 and 130a-130c are shown in communication with network-based mass storage system 110 through network 101. Additionally, server 140 is shown coupled to network 101 for communication with network-based mass storage system 110 and/or user devices 120 and 130a-130c. In operation according to embodiments herein, network-based mass storage system 110 and user devices 120 and 130a-130c cooperate to provide a drive interface delivering various content (e.g., videos, photographs, sound files, electronic documents, etc.) to consumers of the content under control of a content provider, as described in detail below.

Network 101 utilized according to embodiments of the invention may comprise various forms of communication links suitable for communication of digital data files for facilitating content delivery according to the concepts herein. For example, network 101 may comprise a local area network (LAN), a metropolitan area network (MAN), a wide area network (WAN), the Internet, an intranet, an extranet, the public switched telephone network (PSTN), a wireless network (e.g., wireless LAN (WLAN), cellular communications network, etc.), a cable transmission system, and/or the like. Accordingly, wireless communication links (e.g., as represented by the links between user devices 130b and 130c and network 101), wireline links, including optical fiber links, (e.g., as represented by the links between network-based mass storage system 110, user devices 120 and 130a, and server 140 and network 101, and/or combinations thereof may be utilized in providing delivery of content as described herein.

Network-based mass storage system 110 of embodiments comprises one or more processor-based system having one or more processor (e.g., a processor from the CORE line of processors available from Intel Corporation, Santa Clara Calif.), memory (e.g., random access memory (RAM), read only memory (ROM), flash memory, magnetic disk memory, optical disk memory, etc.) and suitable input/output functionality (e.g., network interface card (NIC), keyboard, display, communication interface, etc.) operating under control of an instruction set defining operation as described herein. In particular, network-based mass storage system 110 preferably comprises sufficient mass digital data storage space (e.g., through one or more hard disk drives, optical disk drives, RAM, and/or the like) to facilitate communication and storage of content shared using the drive interface content delivery platform of system 100.

Network-based mass storage system 110 of embodiments provides functionality other than the foregoing content delivery. For example, network-based mass storage system 110 may primarily provide infrastructure for backup or archival storage of user content (e.g., user media files and/or data), such as the MIMEDIA media storage and access platform provided by MiMedia, Inc. of Brooklyn, N.Y. In accordance with embodiments of the invention, network-based mass storage system 110 may comprise one or more system as described in the above referenced patent applications entitled "Systems and Methods for Data Upload and Download" and "Centralized Media Access Portal," adapted to provide drive interface content delivery as described herein. This infrastructure may be leveraged in providing drive interface content delivery platform 100 of embodiments herein.

The drive interface content delivery platform of system 100 may support delivery of content to a number of configurations of processor-based devices. User devices 120 and 130a-130c of the illustrated embodiment illustrate several examples of such processor-based devices, such as personal computers (PCs) represented by user devices 120 and 130a, tablet devices represented by user device 130b, and smart phones and personal digital assistants (PDAs) represented by user device 130c in the illustrated embodiment. Of course, the processor-based systems utilized according to the concepts herein may comprise configurations in addition to or in the alternative to those represented in the illustrated embodiment, such as console devices, gaming devices, televisions, set top boxes, automobiles with media infrastructure, media display devices, etc.

As may be appreciated from the foregoing, user devices 120 and 130a-130c of embodiments comprise processor-based systems having one or more processor (e.g., a processor from the CORE line of processors), memory (e.g., RAM, ROM, flash memory, magnetic disk memory, optical disk memory, etc.) and suitable input/output functionality (e.g., NIC, keyboard, display, communication interface, etc.) operating under control of an instruction set defining operation as described herein. It should be appreciated that ones of the user devices may implement different configurations, such as to provide management functionality for a content provider, user functionality for a consumer of the content, to accommodate operations associated with a content provider and/or consumer. For example, user device 120 may be configured (e.g., through instructions of logic 121) to provide management functionality and user devices 130a-130c may be configured (e.g., through instructions of logic 131a-131c) to provide consumer functionality. It should be appreciated that although one user device is shown adapted for management functionality and three user devices are shown adapted for consumer functionality, there is no limitation to the number of such devices configured for either functionality. Moreover, a user device may be configured to provide both such functionalities.

Server 140 of embodiments comprises one or more processor-based system having one or more processor (e.g., a processor from the CORE line of processors available from Intel Corporation, Santa Clara Calif.), memory (e.g., RAM, ROM, flash memory, magnetic disk memory, optical disk memory, etc.) and suitable input/output functionality (e.g., network interface card (NIC), keyboard, display, communication interface, etc.) operating under control of an instruction set defining operation as described herein. In particular, server 140 preferably comprises a server architecture (e.g., web server, ecommerce server, application service provider (ASP) server, etc.) or other architecture for providing desired functionality utilized in association with drive interface content delivery platform of embodiments herein. For example, server 140 may provide backend services with respect to a content delivery drive, such as to facilitate a content provider offering product and/or services to consumers through their content delivery drives. Of course, although a single server 140 is illustrated in the embodiment of FIG. 1, any number of such systems may be utilized, such as may be associated with different vendors, different services, etc.

In operation according to embodiments of the invention, a content provider may control the delivery of content using a management interface (e.g., provided by content delivery drive 122 and/or dashboard 123 of logic 121 operable on user device 120) to thereby share the content with consumers using a content delivery interface herein (e.g., provided by branded drive 132a-132b and/or branded app 133a-133c of logic 130a-130c operable on a corresponding one of user devices 130a-130c). It should be appreciated that, although a single content delivery drive is shown in the illustrated embodiment with respect to user device 120 used in sharing content by a content provider, any number of such content delivery drives (whether branded or not) may be utilized by a content provider. For example, a content provider may share content with a number of different consumer groups, may share content associated with a number of different subjects or interests, etc., and thus may utilize a different content delivery drive with respect to each such different grouping. Moreover, a number of different content providers may each utilize one or more content delivery drives for sharing content. Accordingly, the embodiment illustrated in FIG. 1 shows multiple branded drives and multiple branded apps, such as may be associated with a plurality of content delivery drives of the same or different content providers, to which corresponding content is pushed according to embodiments herein. It should be appreciated that, although branded content delivery drives are shown, consumers may utilize branded content delivery drives, non-branded content delivery drives, and combinations thereof, according to embodiments of the invention.

Drive interface content delivery provided by the foregoing operation of system 100 employs a "push" type content delivery technique wherein content is actively delivered to the consumers under the control or at the initiation of the content provider. For example, a content provider may add content to a drive interface utilized in managing corresponding content delivery drives to thereby control delivery of the content to the content delivery drives. Thereafter, the consumer may have the pushed content available to them through a content delivery drive provided by the drive interface content delivery platform of system 100.

It should be appreciated that the actual delivery of various content to a consumer may be via a "pull" type interface, even where a "push" type content delivery technique of embodiments is employed. For example, the aforementioned push type content delivery technique may be utilized to deliver a media content file designator to a consumer's user device, thereby providing the appearance of the content having been delivered to a drive interface of the consumer's. Thereafter, the consumer may access that media content file designator to obtain the substance of the content. Such hybrid push-pull delivery techniques may be implemented, for example, for digital rights control, where a content owner wishes to provide streamed content delivery, where a user device has insufficient resources allocated for use by a drive interface, etc.

To aid in understanding the concepts of the present invention, operation of exemplary embodiments of a drive interface content delivery platform will be described below. It should be appreciated, however, that the concepts therein have applicability beyond the particular exemplary embodiments described.

Embodiments of the invention provide a drive interface which is branded in correspondence to the content or content provider, and thus reflects the content or content provider and provides an interactive, direct link between the consumers of the content and the provider of the content. Accordingly, exemplary embodiments below illustrate the use of a branded content delivery drive. It should be appreciated that, although providing an interface which is similar to that of a local drive, the branded content delivery drive provides immediately recognizable association with the content provider and/or content. Such branding may be particularly applicable to delivery of content from professionals, such as celebrities, models, and other public figures, to their fan base or constituency, and thus exemplary embodiments below are provided with branding reference to such professionals. It should be appreciated, however, that embodiments may implement different branding schemes or no branding with respect to the content delivery drive.

In operation according to embodiments of the invention, a content provider may wish to broadly share content, such as for commercial or self-promotional purposes. For example, an artist, such as Shawn Carter who performs under the stage name JAY-Z, may wish to share content (e.g., concert and music videos, publicity photographs, concert announcements and dates, merchandise availability and pricing information, etc.) to his fan base. Accordingly, JAY-Z or his representative (a "content provider" herein) may utilize the drive interface content delivery platform of system 100 to provide pushed content delivery to his fan base ("consumers" of content herein). The content provider may utilize content delivery drive 122 and dashboard 123 operable upon user device 120 to provide, and control, the foregoing content delivery.

Figure 2:
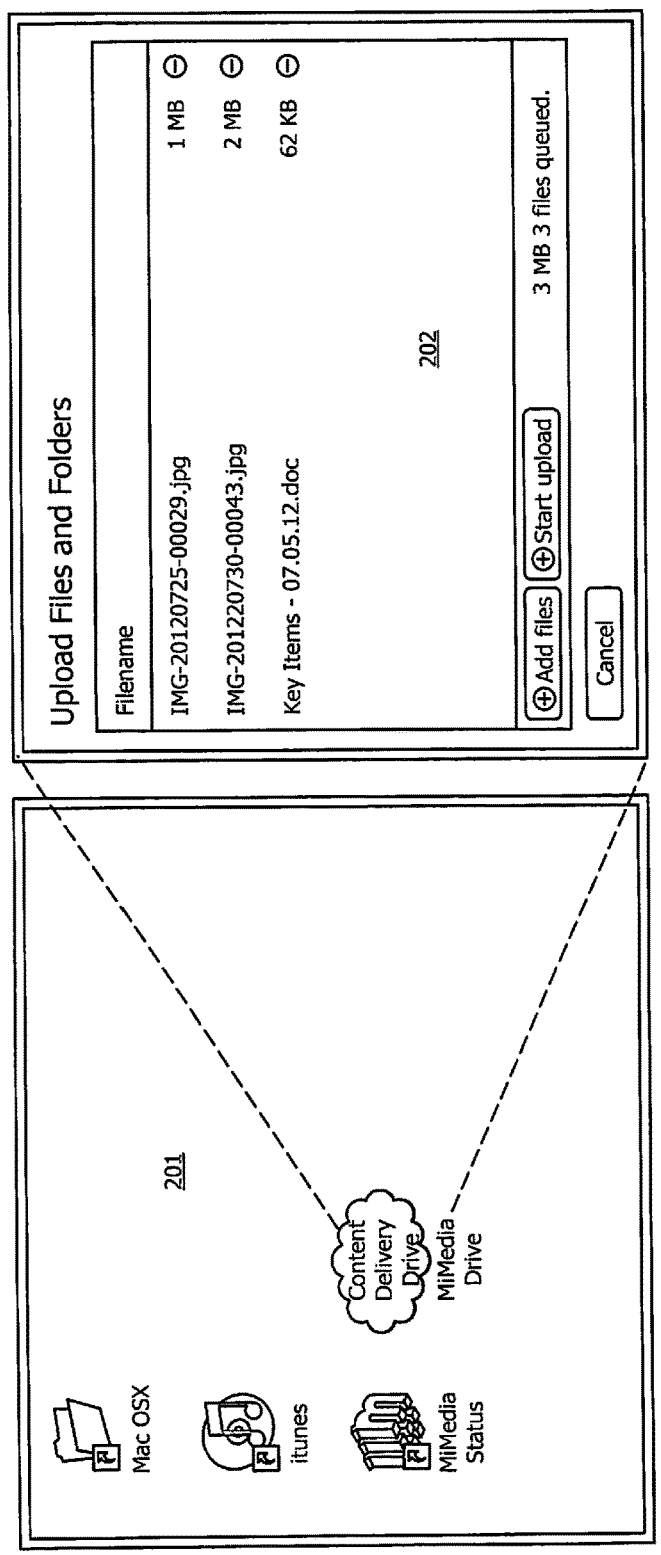
FIG. 2 illustrates use of a content delivery drive by a content provider to provide pushed delivery of content according to embodiments of the invention.

FIG. 2 illustrates use of content delivery drive 122 by a content provider to provide pushed delivery of content according to embodiments of the invention. It should be appreciated that, although branded content delivery drives may be utilized by the consumers, the content delivery drive utilized by a content provider may not be correspondingly branded, as shown in FIG. 2. For example, the content provider is themself the source of the content and generally may not benefit from the branding of the content delivery drive. Moreover, the content provider may share content with a single group and thus use of a content delivery drive designated with the branding may not be needed for properly identifying the appropriate drive for sharing. Of course, the content delivery drive used in managing delivery of content by a content provider may be branded according to the concepts herein, if desired.

As can be appreciated from the embodiment illustrated in FIG. 2, instructions of logic 121 operate to provide content delivery drive 122 represented as a local drive within user interface 201 (e.g., a graphical operating system such as WINDOWS available from Microsoft Corporation, Redmond Wash., or MAC OS available from Apple, Inc., Cupertino Calif.). This representation of a local drive may be utilized by the content provider in managing content delivery. For example, the content provider may add content to content delivery drive 122 to thereby control delivery of the content to corresponding content delivery drives (e.g., branded drives 132a-132b) and/or other content delivery interfaces (e.g., branded apps 133a-133c). In operation according to embodiments, sharing of content may be accomplished through drag-and-drop introduction of the content to be shared to content delivery drive 122. Such interaction is utilized according to embodiments to initiate sharing of content by the drive interface content delivery platform of embodiments. For example, the foregoing provision of content files to content deliver drive 122 preferably results in the uploading of the content (as represented by dialog box 202) to network-based mass storage system 110 for pushed delivery to appropriate content delivery interfaces.

It should be appreciated that the introduction of content for sharing by a drive interface content delivery platform of embodiments of the invention is not limited to the drag-and-drop introduction of the foregoing example. Embodiments may, for example, additionally or alternatively facilitate the automated introduction of content to the drive interface content delivery platform. As one example, content meeting one or more criteria (e.g., media type, content type, creation/modification date, storage location, etc.) stored by user device 120 utilized by the content provider may be identified and automatically uploaded to network-based mass storage system 110 for pushed delivery to appropriate content delivery interfaces.

The content shared using a drive interface content delivery platform of embodiments of the invention may comprise various forms of content, such as videos, photographs, sound files, electronic documents, etc. For example, continuing with the foregoing branded JAY-Z example the content may comprise concert videos, concert schedule documents, single and album music recording releases, recordings of interviews, press releases, publicity photographs, advertisement pieces from sponsors and partners, etc. It should be appreciated that the content for which pushed delivery is provided according to embodiments herein is not limited to more traditional forms of content (e.g., videos, photographs, sound files, and electronic documents), but may additionally or alternatively include content such as Internet links (e.g., to commerce sites selling merchandise offered by the content provider, sponsors, partners, etc.), applications providing user experiences desirable to the consumers (e.g., gaming, communication/interaction with the content provider, access to content, etc.), and/or the like. Any such content may be provided pushed delivery by system 100 of embodiments of the invention.

Code implemented for providing management functionality of embodiments affords the content provider robust control over the sharing of this content. For example, dashboard 123 may be utilized by the content provider to control the delivery and use of content on the consumer's user devices.

Figure 3:
FIG. 3 illustrates use of a dashboard by a content provider to control content shared by the drive interface content delivery platform of embodiments of the invention.

FIG. 3 illustrates use of dashboard 123 by a content provider to control content shared by the drive interface content delivery platform of system 100. It should be appreciated that dashboard 123 may be provided by an application executed locally by user device 120, by a web based application, by a server/client application, etc. In operation according to embodiments of the invention, network-based mass storage system 110 and/or server 140 may interact with user device 120, perhaps executing instructions of logic 121, to provide dashboard 123.

Using dashboard 123 of the embodiment illustrated in FIG. 3, the content provider can control content with full digital rights management (DRM), such as to designate content for local play only, further sharing by consumers, download access, streaming access only, designate a number of accesses to the content by a consumer, access to content at no charge, charge for access to content, charge for access to content after a designated number of accesses or after accessing a designated portion of the content, etc. The content provider may control release dates of the content (e.g., although the content has been added to content delivery drive 122 the content may not be pushed to consumers until a designated date or time), control expiration dates of the content (e.g., the content is no longer accessible or copies are no longer usable after a designated date or time), provide control with respect to the consumers to receive the content (e.g., although a set of consumers may be associated with the content delivery drive used by the content provider, the content provider may select a subset of consumers, such as elite status level consumers, demographically selected consumers, geographically selected consumers, etc.) for receiving and/or having access to particular content, etc. Accordingly, the content provider may maintain tight control with respect to the access, use, further sharing, etc. of the content using the controls implemented by the drive interface content delivery platforms of embodiments.

The control provided with respect to content provided through use of dashboard 123 of embodiments of the invention may comprise more than DRM and access rights. For example, although certain DRM or access rights selections may result in the corresponding content being stored at the network-based mass storage infrastructure rather than locally at the consumer processor-based system (e.g., where streaming access is selected), dashboard 123 may allow a content provider to directly select and control such storage locations, if desired.

It should be appreciated that control (e.g., digital rights control, delivery schedule, expiration schedule, further sharing permissions, etc.) of the content provided to the content provider may be with respect to individual content files or groups of content files. For example, the content provider may utilize dashboard 123 to select the controls to be implemented with respect to a particular content file (e.g., a selected content file, a content file added to content delivery drive 122, etc.). Additionally or alternatively, the content provider may utilize dashboard 123 to select the controls to be implemented with respect to a plurality of content files (e.g., a group of content files having a common attribute, such as similar content or media type, a group of content files added to delivery drive 122, etc.).

Although the control implemented with respect to particular content using dashboard 123 of embodiments may be consistent across all content delivery interfaces (e.g., content delivery drive, content delivery application, web based content delivery, etc.), embodiments may allow a content provider to provide different control with respect to content depending upon which type of content delivery interface is used to access the content. Accordingly, the controls may be tailored to the particular features of the interface used, the types of processor-based systems using the interface, the use scenarios associated with the interfaces, etc.

The foregoing controls may be implemented with respect to the content files by system 100 in a number of ways. For example, in operation according to embodiments of the invention network-based mass storage system 110 preferably provides push delivery of the content to appropriate content delivery interfaces (e.g., branded drives 132a-132b and branded apps 133a-133c) which are associated with content delivery drive 122 and/or the content provider. Information regarding the particular controls to be implemented for content files may be appended to the corresponding files (e.g., in the form of metadata) or otherwise associated with the content files. Accordingly, network-based mass storage system 110 may access this control information when determining when, how, to whom, etc. to deliver the particular content. Additionally or alternatively, various content interfaces (e.g., media players used to access the content, the content delivery drives, etc.) may utilize such control information to control the access provided (e.g., whether or how much of the media is to be played by a media player, whether the content is to be available in the content deliver drive before/after particular dates, etc.).

It should be appreciated that the foregoing implementation of particular aspects of the content control may involve cooperative control implemented by various of the components of system 100. For example, network-based mass storage system 110 may determine that controls for a particular content file allow for the content to be streamed only. Accordingly, network-based mass storage system 110 may retain storage of the content file and push "shortcuts" to the appropriate consumer's content delivery drives which, although providing the appearance of the content having been delivered to the contend delivery drive, facilitates streaming access to the content when accessed by the consumer (e.g., through cooperative operation of a media player local to the consumer and the network-based mass storage system). As another example, logic of the content delivery drive interface providing an instance of a content delivery drive may prevent or otherwise control access to content files (e.g., to prevent access before/after a particular date, to prevent copying or further sharing, to control the particular media players accessing the content, to allow partial playback of the content without premium status or purchase of the content, etc.).

In operation according to embodiments herein, content provided to the drive interface content delivery platform by a content provider for sharing is pushed to consumers of the content, preferably in accordance with controls selected or otherwise established by the content provider. Drive interface content delivery platforms of embodiments may, for example, implement a network based or "cloud based" infrastructure utilized in facilitating pushed delivery of content. The embodiment illustrated in FIG. 2, for example, comprises network-based mass storage system 110 upon which content is stored for delivery to consumers. Although network-based storage system 110 utilized in the pushed delivery of content may be provided in various configurations according to embodiments of the invention, exemplary configurations as may be adapted for operation as described herein are shown and described in the above United States patent applications entitled "Systems and Methods for Data Upload and Download" and "Centralized Media Access Portal."

The content may be pushed (e.g., by network-based mass storage system 110) to corresponding consumer content delivery drives (e.g., content delivery drives 132a-132b branded by or otherwise associated with the content provider and/or the content delivery drive used by the content provider) of processor-based systems (e.g., user devices 130a-130c) of the appropriate consumers for local storage by those processor-based systems. Additionally or alternatively, information (e.g., file pointers, "shortcuts", etc.) enabling access to the content (e.g., as may be stored by network-based mass storage system 110) may be pushed to the corresponding consumer content delivery drives of processor-based systems of the appropriate consumers for use in accessing content. Embodiments may utilize a combination of the aforementioned local content storage and information enabling access to the content, such as with respect to different processor-based systems (e.g., local storage where the processor-based system has adequate resources and access information where the processor-based system has limited resources, local storage for content with less restrictive rights management and access information for content with highly restrictive rights management, etc.).

In operation according to embodiments of the invention, the consumer may be alerted to or notified of the arrival of pushed content. For example, a graphical alteration of or addition to an icon representing the content delivery drive may be provided when content has been provided to the consumer's content delivery drive (e.g., alert icon 432 shown in FIGS. 4A and 4D). Similarly, an alert sound may be played, in combination with or separate from the aforementioned graphical alert, in order to notify the consumer that new content is available in the content delivery drive. Additionally or alternatively, notification or messaging outside of the drive interface content delivery platform, such as via email, SMS messaging, pop-up messages, etc. (e.g., alert message 433 shown in FIG. 4D), may be utilized to notify a consumer of the availability of content. Such notification or messaging may, for example, leverage native notification functionality of the underlying user devices.

Figure 4A:
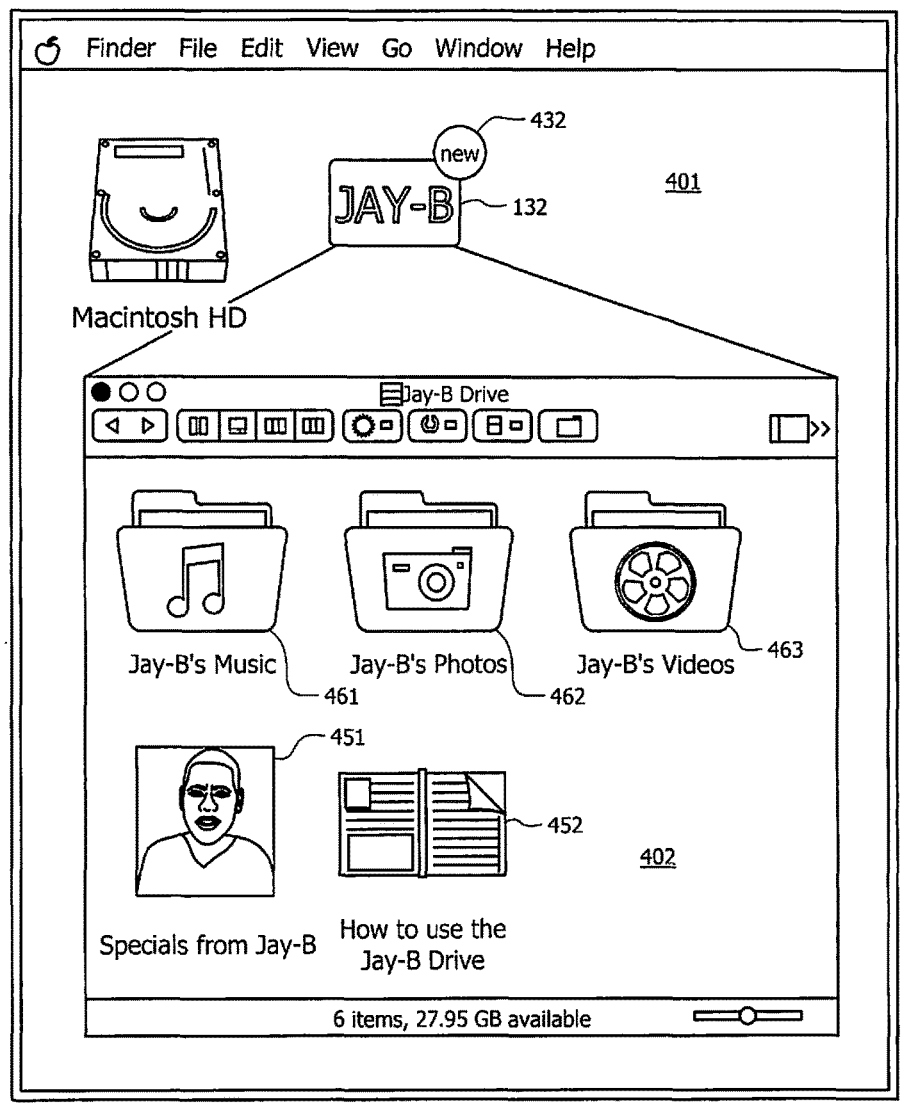
FIG. 4A illustrates use of a content delivery drive by a consumer to access pushed delivery of content according to embodiments of the invention.

FIG. 4A illustrates operation of content delivery drive 132, corresponding to any of content delivery drives 132a-132b of FIG. 2. In the embodiment of FIG. 4, drive interface code is provided for execution by processor-based systems (e.g., user devices 130a-130c) and operable to provide branded drive 132 for delivery of content to the consumers. Specifically, branded drive 132 of the illustrated embodiment is presented to a user within user interface 401 (e.g., a graphical operating system such as WINDOWS available from Microsoft Corporation, Redmond Wash., or MAC OS available from Apple, Inc., Cupertino Calif.). This representation of a local drive may be utilized by the consumer to access content shared by the content provider using a corresponding content delivery drive (e.g., content delivery drive 122) of the drive interface content delivery platform. Accordingly the pushed content, whether the actual content files or file pointers etc., are presented to the consumer for access, as shown in window 402.

As can be seen in the embodiment of FIG. 4A, content delivery drives (e.g., branded drive 132) may utilize a hierarchical data structure (e.g., a file/folder data structure) of the underlying operating system. Additionally or alternatively, the content delivery drives may contain various forms of files and records (e.g., content files, applications, folders, file pointers, etc.). In particular, the illustrated embodiment shows application 451 (e.g., as may run independently, interact with one or more external service provided by systems such as network-based mass storage system 110 or server 140, etc.), document 452 (e.g., as may provide various information, such as help text, frequency asked questions, concert date information, etc.), and folders 461-463 (e.g., as may provide sub-containers for applications, documents, media files, file pointers, etc.).

As can be appreciated from the foregoing, irrespective of whether local storage of the content is actually employed, embodiments of a drive interface content delivery platform provides a user interface in which the content appears to be stored locally as perceived by the consumer. Accordingly, a consumer may access branded drive 132 to provide window 402 exposing content shared by the content provider. The consumer may then be provided access to this content in a similar manor to any other content stored locally by the user device, as allowed by the controls implemented by the content provider.

Although embodiments have been described above with reference to pushing content to content delivery drives for sharing content with consumers, drive interface content delivery platforms of embodiments of the invention may provide push delivery of content to various processor-based devices through means in addition to the aforementioned content delivery drive interfaces. For example, the content shared by a content provider may be pushed to applications (e.g., branded applications 133a-133c) for access by consumers. For example, a smart phone or PDA (e.g., user device 130c) may have limited resources (e.g., small display, limited operating system, limited user input, etc.) and/or the type or arrangement of the content (e.g., very large collections of unrelated content) may impede the use of a content delivery drive of embodiments and thus a branded application (e.g., branded application 133c) may be utilized for accessing the shared content.

Figure 4B:
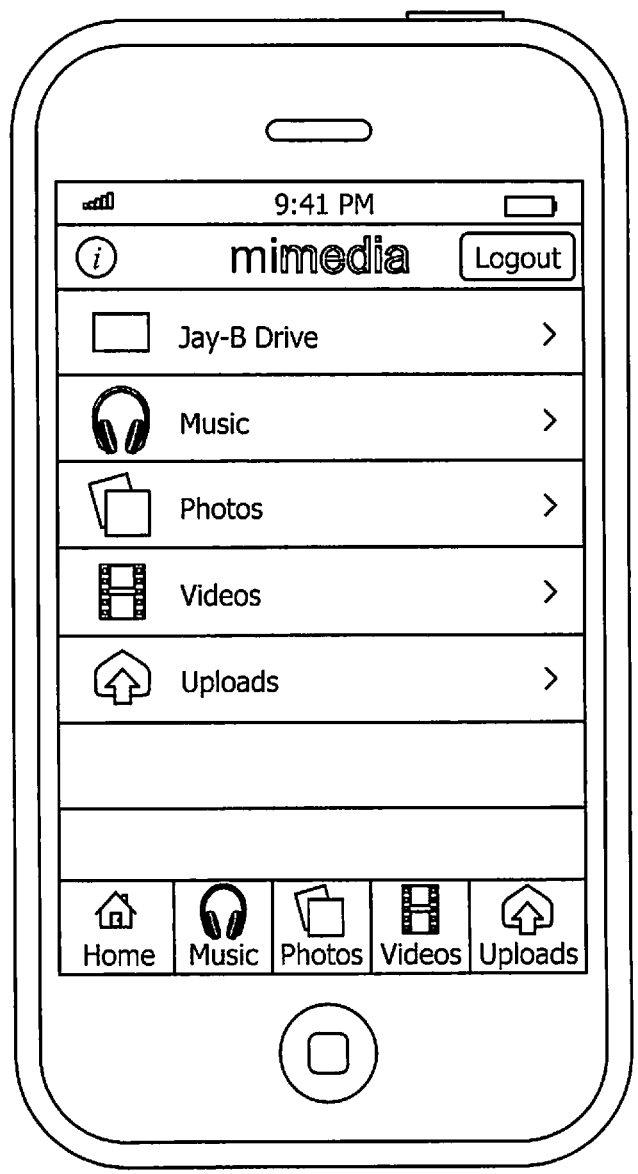
FIGS. 4B and 4C illustrate use of alternative content delivery interfaces by a consumer to access pushed delivery of content according to embodiments of the invention.
Figure 4C:
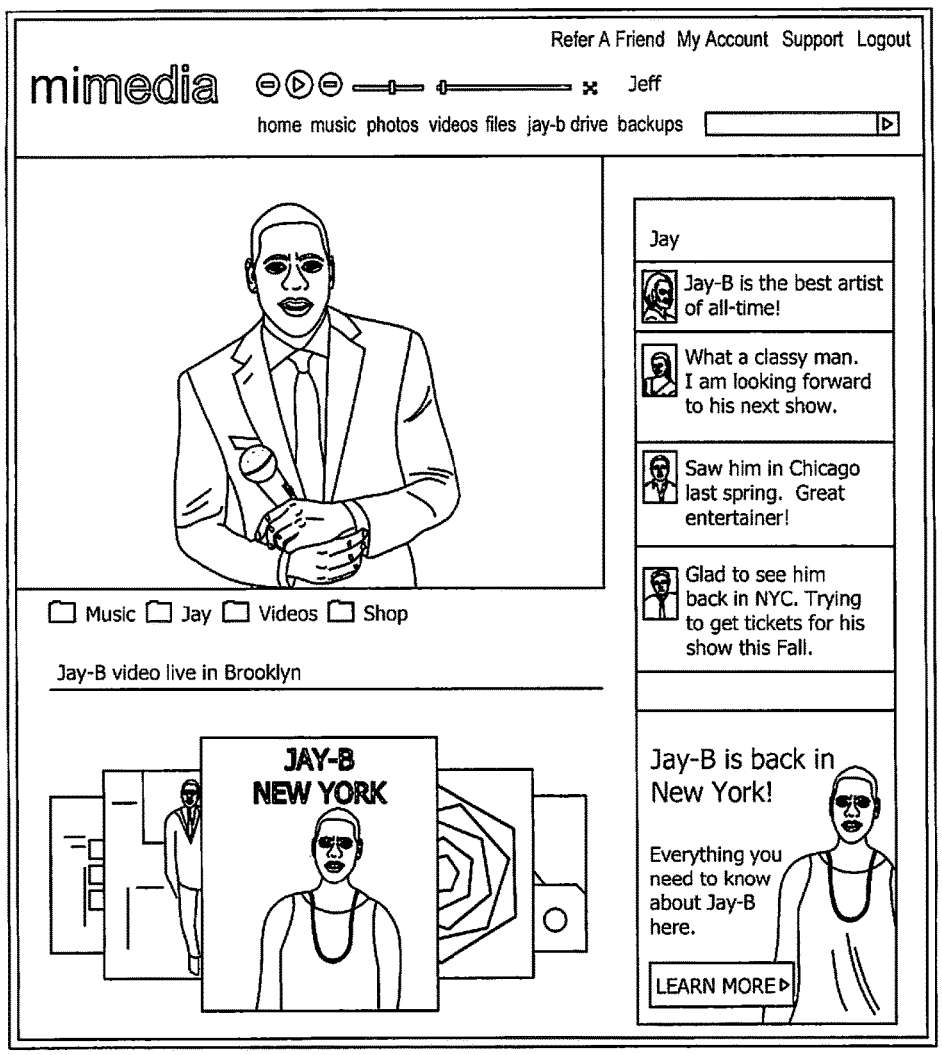
Figure 4D:
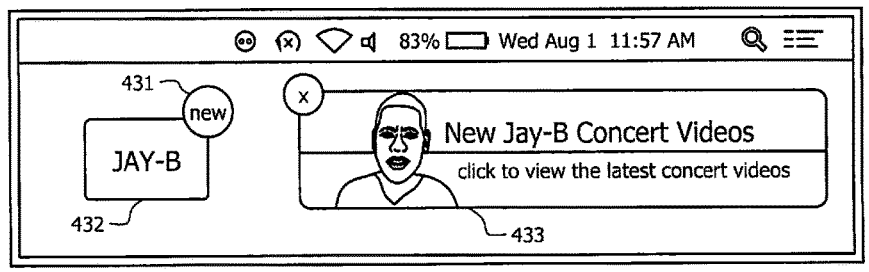
FIG. 4D illustrates an alert message provided according to embodiments of the invention.

Embodiments of a drive interface content delivery platform provide a plurality of content delivery interfaces, such as may include content delivery drive interfaces, application interfaces, and web based interfaces, as represented by the content delivery drive interface of FIG. 4A, the application interface of FIG. 4B, and the web based interface of FIG. 4C. In operation according to embodiments, parity of content is provided with respect to each such content delivery interface, such that the shared content is equally available through each such interface. Consumers of the content are thus provided robust access to pushed content using any of a number of processor-based devices and/or content delivery interfaces.

Although the same content may be available using any of the content delivery interfaces, the user experience may be enhanced or modified through use of one or more such content deliver interface. For example, although the above exemplary content delivery drive interface may provide access to shared content consistent with that of file access though a host operating system, the aforementioned application interfaces and/or web based interfaces may provide a different user experience.

Figure 5:
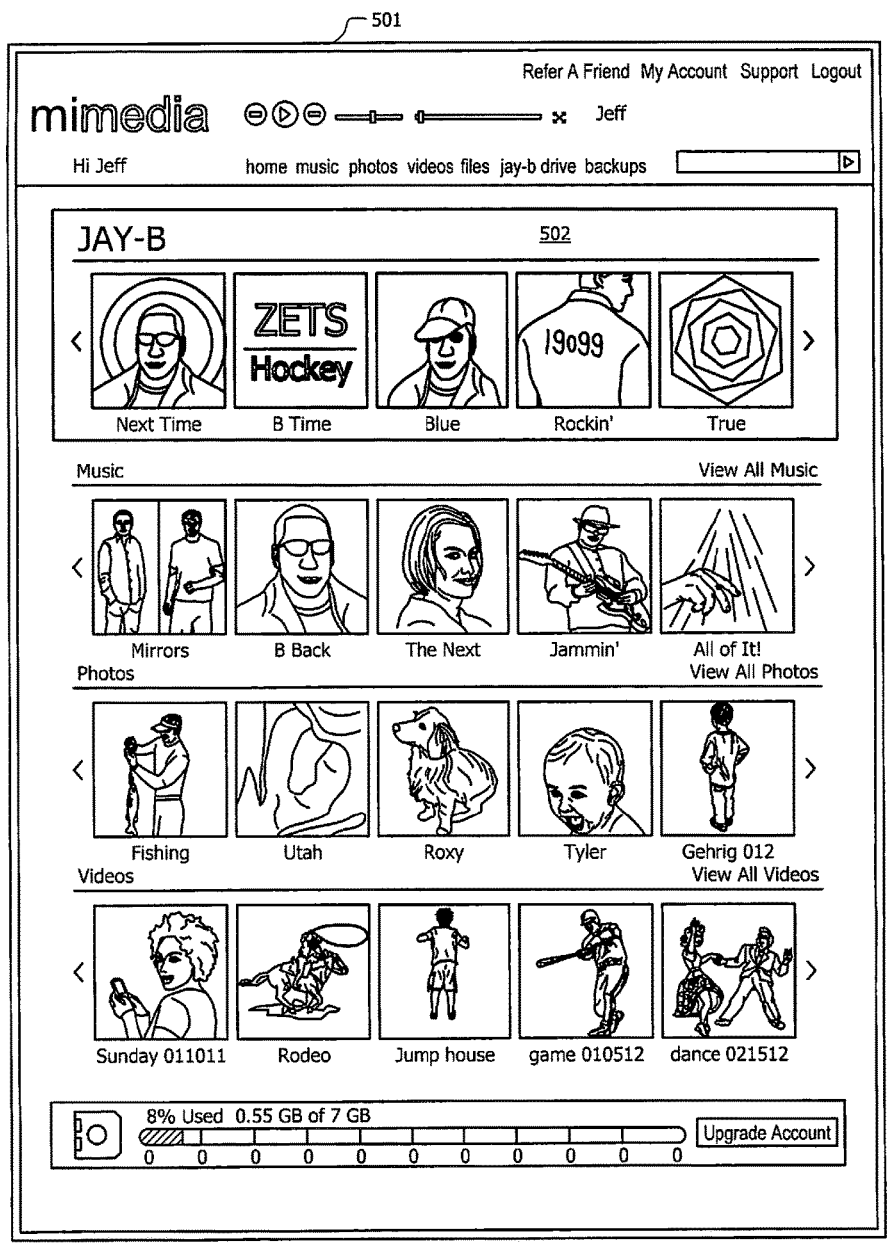
FIG. 5 illustrates an integrated interface in which pushed content is presented alongside a consumer's personal content according to embodiments of the invention.

Network-based mass storage system 110 may provide functionality in addition to the foregoing content delivery functionality. For example, network-based mass storage system 110 of embodiments may provide backup or archival storage of user content (e.g., user media files and/or data), such as the MIMEDIA media storage and access platform provided by MiMedia, Inc. of Brooklyn, N.Y. Such a network-based mass storage system may include a user interface operable to facilitate user access to their various media (e.g., using different media galleries as shown in the above reference United States patent application entitled "Centralized Media Access Portal"). Such a user interface and/or other features of the network-based mass storage system may be leveraged in providing a drive interface content delivery platform of embodiments herein. For example, the content shared through the drive interface content delivery platform may be presented in an added gallery (e.g., branded channel 502 presented in interface 501 of FIG. 5, such as may comprise an interface presented by an application or browser providing a web session). Accordingly, the shared content may be provided in a robust interface, such as may be familiar to the consumer through their use of a similar interface for their personal media content. Such an embodiment provides integration and interaction of the shared content with personal content (e.g., branded content is presented alongside the personal media in the consumer's personal media interface).

Figure 6:
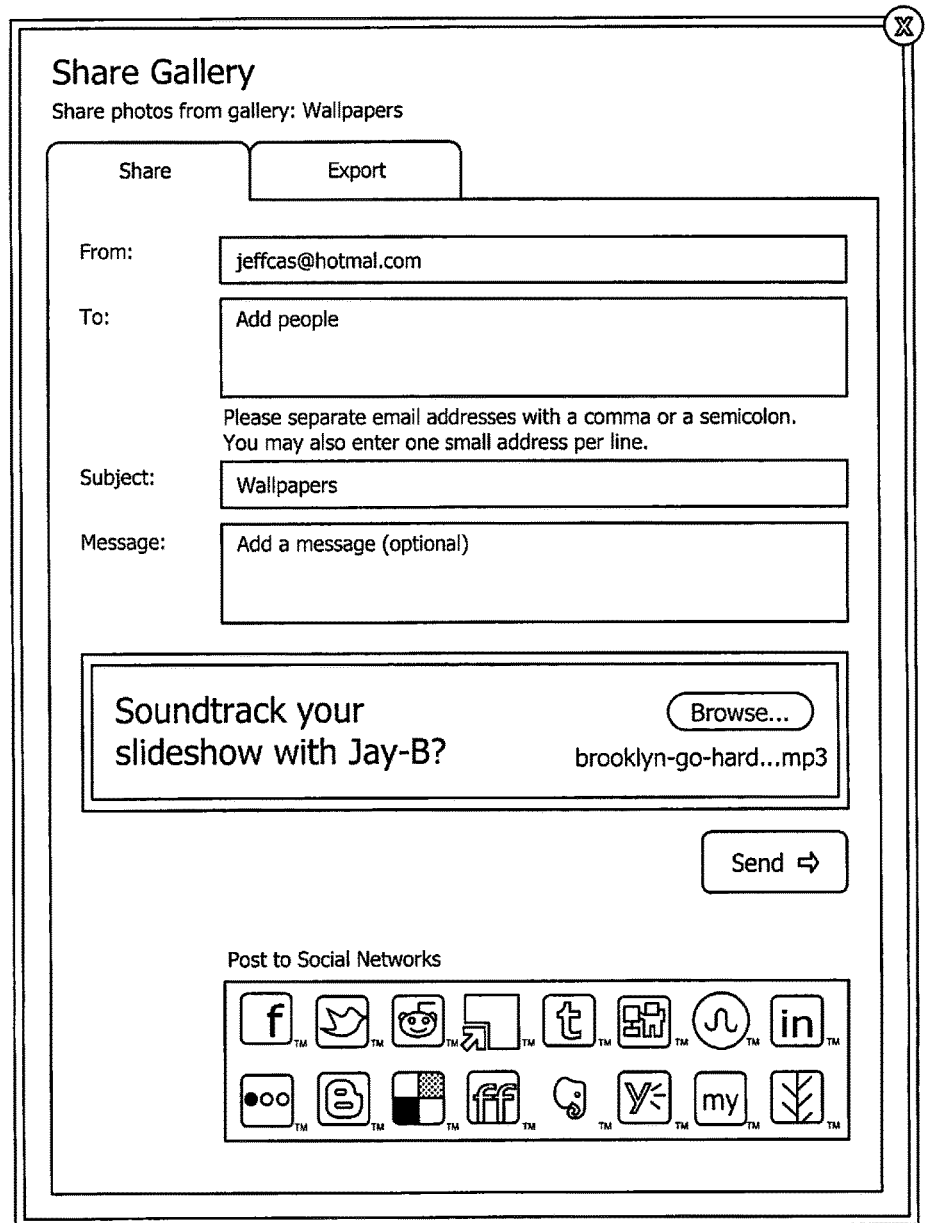
FIG. 6 illustrates an interface allowing a consumer to provide further sharing and/or linking of content according to embodiments of the invention.

The integration of content provided according to embodiments of the invention may go beyond presenting personal content of the consumer alongside of content shared by the content provider. For example, a consumer may be enabled to link the content, such as to create a slide show of personal photographs of a concert (perhaps with photographs of the concert shared by the content provider) set to musical content provided by the content provider, such as using an appropriate interface of the content delivery interface, such as represented by user interface 601 of an embodiment of the drive interface content delivery platform shown in FIG. 6. Such integrated content may be shared by the consumer (e.g., with other consumers associated with the content provider's shared content, with friends of the consumer, with the world at large, etc.) in accordance with controls placed upon the shared content by the content provider. Such sharing of the integrated content may be through content delivery interfaces of the drive interface content delivery platform or through other interfaces (e.g., social media such as FACEBOOK and TWITTER, hosting platforms such as PHOTOBUCKET and FLICKR, direct file sharing, etc.). A content provider may, for example, establish controls with respect to the shared content (or some portion thereof) to allow only sharing of the content (either alone or when integrated with consumer content) only with other consumers to which the content is shared through the drive interface content delivery platform to thereby closely control the distribution of the content and provide value to that group of consumers. Alternatively, the content provider may establish control with respect to the shared content (or some portion thereof) to allow sharing of the content (either alone or with integrated with consumer content) beyond the consumers to which the content is shared through the drive interface content delivery platform (e.g., allowing a single access and/or no further sharing so such additional consumers) to thereby control the distribution of the content while still promoting the content to an expanded group of consumers. It should be appreciated that consumers may be enabled to share personal content, such as to other consumers to which a content provider shares content, without integration with the content shared by the content provider according to embodiments herein.

Figure 7A:
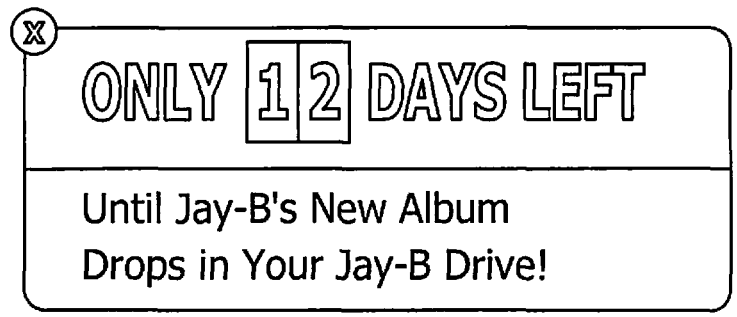
FIGS. 7A-7C illustrate examples of messaging and interaction as provided by a drive interface content delivery platform of embodiments of the invention.

The enhanced user experience provided with respect to shared content by drive interface content delivery platforms of embodiments herein includes features in addition to or in the alternative to the examples described above. For example, the content delivery, notifications, and functionality integration of embodiments of the invention facilitate such enhanced features as targeted promotion and direct sales. Messaging of the drive interface content delivery platform, such as shown in FIG. 7A, may be utilized to notify consumers of various promotions. Content (e.g., applications, links, etc.) pushed to the consumer's content delivery drives, such as may be identified in the aforementioned notification messages, may be utilized to allow the consumers to view, select, and/or purchase the promoted products, such as through cooperative operation provided by server 140 to provide ecommerce and/or other backend functionality.

Figure 7B:
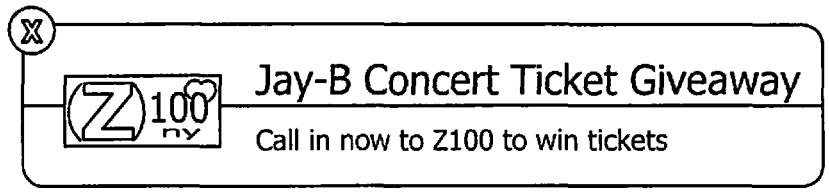

As another example, advertising of sponsors and partners of the content provider, or of any other entity selected by the content provider, may be delivered using the messaging and/or content delivery of embodiments of the invention. For example, consumers may be alerted in real-time of promotions offered by various entities, such as shown in FIG. 7B.

As still another example, content may be targeted to the particular consumers. Messaging and content delivered according to embodiments may be targeted to a particular group of consumers, such as to notify consumers in a particular city of an upcoming concert using the aforementioned messaging and to offer ticket and merchandise sales through corresponding delivery of content (e.g., applications, links, etc.). Additionally or alternatively, messaging and content may be targeted to an individual consumer, such as to offer content (e.g., recording tracks) missing from their collection, content relevant to the consumer's personal experience (e.g., video of a concert attended by the consumer), etc.

Figure 7C:
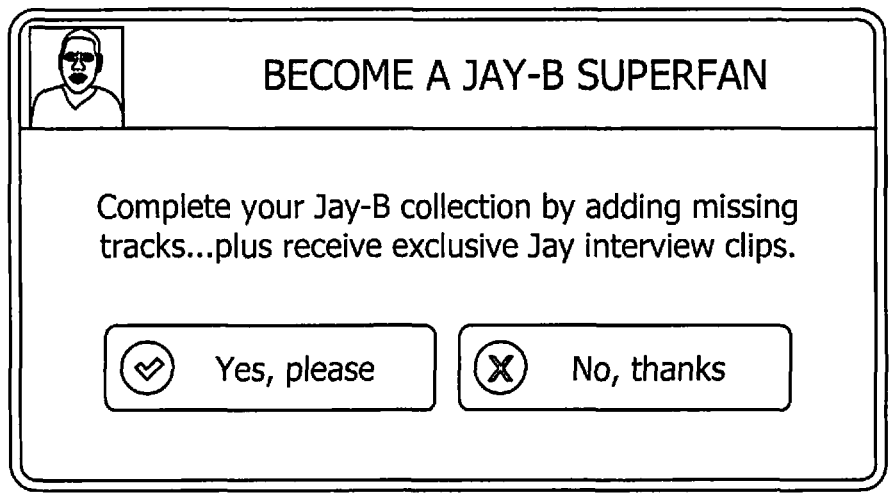

Such messaging and content sharing may employ gamefication to stimulate the consumer's interest. For example, messaging may be provided which offers a particular consumer the opportunity to answer trivia questions about the content provider in order to receive content missing from their collection, as shown in FIG. 7C. An application or link may be pushed to the consumer's content delivery drive (or other content delivery interface) in association with the message such that election to participate accesses this corresponding content and initiates the game.

It can be seen from the foregoing that interaction provided through the use of content delivered by the drive interface contend delivery platform facilitates robust interaction between the content provider and the consumers. For example, the gamefication described above provides an engaging opportunity for two way interaction between the content provider and the consumers which facilitates not only an enhanced user experience, but allows the content provider to collect information about the consumers (e.g., to use in providing a still further enhanced user experience through targeted communication and content delivery) and allows the consumer to feel more connected to the content provider and even receive content more personally relevant to the consumer. Of course, the two way interaction provided according to embodiments herein need not be limited to a gamefication embodiment. For example, applications or links pushed to the consumer's content delivery drive (or other content delivery interface) may provide for two way interaction, such as submission of questions and requests to the content provider and receipt of answers and content responsive to the consumers' questions and requests.

It should be appreciated that through the content provider and consumer integration provided according to embodiments of drive interface content delivery platforms herein, the content provider may be afforded rich information regarding the consumers and their use of the shared content. For example, where a drive interface content delivery platform is implemented using network-based mass storage system 110 providing infrastructure for backup or archival storage of user content, as described above, the content provider may be made aware of particular content available from the content provider which the consumer does not already have. Accordingly, the content provider can provide offers or content delivery targeted to that consumer addressing this gap in the consumer's collection of content. Likewise, a content provider may be provided visibility into the consumers' use and access to the shared content, such as through operation of the logic implementing the content delivery interfaces (e.g., the content delivery drives and content delivery applications) and/or in accordance with the controls established with respect to the content to report instances of access to the content, the specific actions taken with respect to the content, etc. As another example, a content provider may be provided visibility into the consumers' interest in particular content through direct sales, such as content and merchandise sales, ticket sales, etc., made through the drive interface content delivery platform.

The content provider may additionally or alternatively be provided information relevant to the sharing of content through means outside of the direct operation of a drive interface content delivery platform. For example, unique ticket codes may be utilized to indicate that a consumer attended a particular concert, promotions regarding the availability of the content provider's branded drive may be made at concerts and other venues, etc. A consumer may provide particular information from these sources which in turn supplies particular information to the content provider. The user experience may be tailored to the consumer using such information. For example, where a consumer uses a promotional code from a concert or the unique ticket number associated with a particular concert to obtain the branded drive associated with that content provider, the branded drive may be pre-populated with content (e.g., video, photographs, etc.) from that particular concert. Accordingly, the consumer is provided shared content to which the consumer has a personal connection, thereby enhancing the user experience.

It should be appreciated that not only is the consumer's experience expanded and enhanced by operation of drive interface content delivery platforms of embodiments of the invention, but the content provider's experience is also significantly improved over that afforded by prior content delivery platforms. In particular, the content provider of embodiments herein is provided robust interaction with the consumers through the drive interface content delivery platform. By providing a content delivery platform which is controlled by the content provider and which provides direct access to the consumers of the content, the content provider is able to not only control things such as advertising content which may be delivered with or in association with the content, but also has access to rich information regarding the consumers and their consumption of the content. Likewise, the content providers of embodiments herein are provided a level of content control which is not available with traditional content delivery platforms available to such content providers. In operation according to embodiments, a consumer is provided flexibility to control the consumer's experience within the parameters of content control established by the content provider. For example, a consumer may establish user preferences regarding content delivery, content playback, content sharing (e.g., for uploading relevant content to the content provider for inclusion in a particular content collection delivered to others via a branded drive interface), etc. to thereby allow the consumer to tailor their experience within the confines of boundaries the content provider may establish.

In addition to the foregoing, content providers of embodiments herein are provided better revenue opportunities, such as ecommerce revenue, direct advertising revenue, revenue sharing for consumers' ancillary purchase of goods and services, etc. Moreover, the content providers may be provided with revenue opportunities that are not available through traditional content delivery platforms. For example, where the infrastructure utilized by the drive interface content delivery platform provides other functionality, such as the aforementioned backup or archival storage of user content, revenue opportunities exist for the content provider where the consumers of their content also purchase other available services (e.g., a revenue split between a service provider providing the additional functionality and the content provider that delivered the consumer to the service provider). Such revenue opportunities may extend well beyond a time that the consumer is active with or interested in the shared content provided by the content provider.

Although exemplary embodiments have been described above wherein a content provider (e.g., JAY-Z) shares content with consumers (e.g., JAY-Z fans) in association with a commercial endeavor (e.g., promotion of the JAY-Z brand of goods and services), and thus provides a business to consumer (B-to-C) implementation, a drive interface content delivery platform herein may be used in a number of different scenarios. For example, a content provider may be a professional (e.g., a celebrity, model, author, etc. sharing content from their professional career), individual (e.g., amateur working towards a professional career), or a business (e.g., a media distributor, a publisher, etc. sharing content as part of their commercial operations) sharing the content in association with a commercial endeavor. Likewise, a content provider may be an individual or a business sharing the content for non-commercial purposes (e.g., an individual sharing content with friends and family or a business sharing content internally, not as part of their commercial operations). A consumer of the content may be any entity, such as an individual, a professional, or a business, having a need or desire for the particular content, whether that need is related to a commercial endeavor or not. Accordingly, it should be appreciated that drive interface content delivery platforms of embodiments of the invention may additionally or alternatively be utilized in providing consumer to consumer (C-to-C), business to business (B-to-B) content delivery, and consumer to business (C-to-B).

As an example of a B-to-B scenario, an agent may wish to promote their talent to other agents within a talent firm. Accordingly, an agent may establish a branded drive herein for their talent in order to push content (e.g., promotional photographs, promotional recordings, audition videos, resumes, etc.) to other professionals within the agency in order to increase the awareness of the talent's skills and capabilities for assistance in recognizing appropriate opportunities for the talent.

As an example of a C-to-C scenario, many individuals may share a common interest (e.g., a hobby, an interest in a genre of music, etc.), wherein a consumer may have particular skills or talent with respect to this common interest (e.g., a wealth of experience and information regarding the hobby, amateur music performing skills, etc.) and thus may share content with other consumers having an interest. The consumer may establish a content delivery drive (branded, such as with the consumer's name, Internet avatar "handle", etc., or non-branded) to share their content with other consumers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
providing a content provider content delivery drive interface to a processor-based system of a content provider having one or more consumer content delivery drive interface associated therewith, wherein the content provider content delivery drive interface provides emulation of a drive local to the content provider processor-based system;
providing a consumer content delivery drive interface of the one or more consumer content delivery drive interface to a user device of a consumer of the content, wherein the consumer content delivery drive interface provides emulation of a drive local to the user device, the emulation including local storage of content at the user device, and wherein the consumer content delivery drive interface is branded to identify a source of the content; and
providing pushed delivery of content from the content provider to the consumer by the content provider introducing the content to the content provider content delivery drive interface and the content being pushed to the consumer content delivery drive interface, wherein, based on available resources of the user device, the pushed delivery of the content provides one of the content and information for accessing the content to the consumer content delivery drive interface.

2. The method of claim 1, wherein the consumer content delivery drive interface is branded to identify the content provider as the source of the content.

3. The method of claim 1, wherein, based on the available resources of the user device having first characteristics, the pushed delivery of the content results in the content being stored locally at the user device.

4. The method of claim 3, wherein, based on the available resources of the user device having second characteristics, the pushed delivery of the content results in the information for accessing the content being stored locally at the user device based the available resources of the user device, wherein the information for accessing the content comprises a file pointer that points to a remotely stored instance of the content.

5. The method of claim 1, further comprising:
determining a venue associated with the consumer having been provided the consumer content delivery drive interface, wherein the pushed content comprises content associated with the venue.

6. The method of claim 1, further comprising:
determining content possessed by the consumer, wherein the pushed content comprises content determined not to be possessed by the consumer.

7. The method of claim 1, further comprising:
providing interaction between the content provider and the consumer via the content provider content delivery drive interface and the consumer content delivery drive interface, wherein the pushed content comprises content provided as a result of the interaction between the content provider and the consumer.

8. The method of claim 1, wherein the content pushed from the content provider to the consumer comprises a plurality of media content files having media content related to the branding of the branded consumer content delivery drive, wherein the plurality of media content files comprise media content files of at least two of the media content file types consisting of digital photographs, digital video, digital sound, and digital documents.

9. The method of claim 1, further comprising:
providing a content control management interface adapted to instantiate control of the content as selected by the content provider when the content is accessed by the consumers; and
implementing consumer preferences with respect to either or both of delivery of the content to the user device or access to the content using the user device within parameters of the content control instantiated by the content provider.

10. The method of claim 9, wherein the control comprises: digital rights management, sharing of the content by the consumer, control of a number of accesses by the consumer to the content, control of an amount of the content accessible to the consumer, or a combination thereof.

11. The method of claim 1, further comprising:
disposing a network-based mass storage system in communication with the content provider content delivery drive interface and the consumer content delivery drive interface; and
communicating the content from the content provider content delivery drive interface to the network-based mass storage system for the pushed delivery to the consumer content delivery drive interface.

12. The method of claim 11, wherein providing, via the pushed delivery of the content, the content to the consumer content delivery drive interface comprises:
communicating the content from the network-based mass storage system to the consumer content delivery drive interface; and
storing the content locally at the user device for access via the consumer content delivery drive interface.

13. The method of claim 11, wherein providing, via the pushed delivery of the content, the information for accessing the content to the consumer content delivery drive interface comprises:
storing the content at the network-based mass storage system;
communicating a file pointer from the network-based mass storage system to the consumer content delivery drive interface; and
storing the file pointer locally at the user device for access to the content via the consumer content delivery drive interface and the file pointer.

14. A method comprising:
providing a consumer content delivery drive interface operable upon a user device of a consumer of content, wherein the consumer content delivery drive interface provides emulation of a drive local to the user device, the emulation including local storage of content pushed to the user device under control of a content provider remote from the user device, and wherein the consumer content delivery drive interface is branded to identify a source of the content;
receiving pushed delivery of content at the user device under control of the content provider, wherein, based on available resources of the user device, the pushed delivery of the content provides one of the content and information for accessing the content to the consumer content delivery drive interface; and providing access to the content by the consumer in accordance with one or more control selected by the content provider.

15. The method of claim 14, wherein the consumer content delivery drive interface is branded to identify the content provider as the source of the content.

16. The method of claim 14, wherein, based on the available resources of the user device having first characteristics, the pushed delivery of the content results in the content being stored locally at the user device, and wherein, based on the available resources of the user device having second characteristics, the pushed delivery of the content results in the information for accessing the content being stored locally at the user device, wherein the information for accessing the content comprises a file pointer that points to a remotely stored instance of the content.

17. A system comprising:

computer executable logic operable to provide a content provider content delivery drive interface at a processor-based system of a content provider, wherein the content provider content delivery drive interface provides emulation of a drive local to the content provider processor-based system;

computer executable logic operable to provide a consumer content delivery drive interface at a user device of a consumer of the content, wherein the consumer content delivery drive interface provides emulation of a drive local to the user device, the emulation including local storage of content at the user device; and a network-based mass storage system in communication with the content provider content delivery drive interface and the consumer content delivery drive interface, wherein the network-based mass storage system is operable to provide pushed delivery of content from the content provider to the consumer when the content provider introduces the content to the content provider content delivery drive interface, and wherein, based on available resources of the user device, the pushed delivery of the content provides one of the content and information for accessing the content to the consumer content delivery drive interface.

18. The system of claim 17, wherein the consumer content delivery drive interface is branded to identify the content provider as the source of the content.

19. The system of claim 17, wherein the consumer content delivery drive interface is branded to identify a source of the content.

20. The system of claim 17, wherein, based on the available resources of the user device having first characteristics, the pushed delivery of the content results in the content being stored locally at the user device, wherein, based on the available resources of the user device having second characteristics, the pushed delivery of the content results in the information for accessing the content being stored locally at the user device based the available resources of the user device, and wherein the information for accessing the content comprises a file pointer that points to a remotely stored instance of the content.

* * * * *